United States Patent
Mehta et al.

(10) Patent No.: US 7,370,333 B2
(45) Date of Patent: May 6, 2008

(54) EFFICIENT PROCESSING OF A CONVOY WORKFLOW SCENARIO IN A MESSAGE DRIVEN PROCESS

(75) Inventors: Bimal Mehta, Sammamish, WA (US); Johannes Klein, Sammamish, WA (US); Lee Graber, Kirkland, WA (US); Paul Maybee, Seattle, WA (US); Sriram Balasubramanian, Bellevue, WA (US); Sanjib Saha, Bellevue, WA (US); Satish R. Thatte, Redmond, WA (US); Paul F. Ringseth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 10/452,961

(22) Filed: Jun. 2, 2003

(65) Prior Publication Data
US 2005/0015776 A1   Jan. 20, 2005

(51) Int. Cl.
*G06F 9/44* (2006.01)
(52) U.S. Cl. ................................. 719/313; 719/315
(58) Field of Classification Search ................ 719/310, 719/311, 312, 313, 315; 709/200, 203; 707/101, 707/102, 10; 705/7, 9
See application file for complete search history.

(56) References Cited

U.S. PATENT DOCUMENTS

| | | | |
|---|---|---|---|
| 5,630,069 A * | 5/1997 | Flores et al. ................... 705/7 |
| 5,867,824 A * | 2/1999 | Saito et al. ..................... 705/9 |
| 6,529,932 B1 | 3/2003 | Dadiomov et al. .......... 709/101 |
| 6,571,246 B1 * | 5/2003 | Anderson et al. ............. 707/10 |
| 7,028,223 B1 * | 4/2006 | Kolawa et al. ................ 714/38 |
| 7,055,143 B2 * | 5/2006 | Ringseth et al. ............. 717/143 |
| 7,110,843 B2 * | 9/2006 | Pagnano et al. ............. 700/108 |
| 7,174,338 B2 * | 2/2007 | Leymann et al. ........... 707/101 |
| 2003/0093468 A1 * | 5/2003 | Gordon et al. .............. 709/203 |
| 2004/0015564 A1 * | 1/2004 | Williams .................... 709/219 |
| 2004/0139144 A1 * | 7/2004 | Batra et al. ................. 709/200 |
| 2004/0193635 A1 * | 9/2004 | Hsu et al. ................... 707/102 |

OTHER PUBLICATIONS

Apshankar et al. "Web Services Business Strategies and Architectures", 2002, Chapter 10: Business Process Standards for Web Services, pp. 1-12.*

(Continued)

*Primary Examiner*—Van H. Nguyen
(74) *Attorney, Agent, or Firm*—Woodcock Washburn LLP

(57) ABSTRACT

An XLANG/s compiler detects convoy scenarios during compilation and generates runtime directives to correctly correlate incoming messages with business process instances. A convoy scenario, present in event driven processes, is defined by a correlation set initialized during a receive operation which is provided to a subsequent receive operation. The compiler detects those convoy scenarios by analyzing the control and dataflow of a XLANG/s program. Three convoy patterns are distinguished: (1) activation convoys, (2) uniform sequential convoys, and (3) non-uniform sequential convoys. XLANG/s allows declarative descriptions of convoy scenarios without requiring an understanding of the low-level details supporting their correct execution. Convoy scenarios are processed by statically analyzing a written workflow application to deduce the nature and type of convoy scenarios used by the application. Information is extracted at compile time to support the runtime infrastructure. The runtime infrastructure is tightly integrated with the underlying correlation and subscription evaluation framework.

21 Claims, 5 Drawing Sheets

OTHER PUBLICATIONS

Curbera et al. "Web Services: Why and How", 2001, pp. 1-7.*

Andrews, T. et al., "Business Process Execution Language for Web Services", *BEA Systems, International Business Machines Corporation, Microsoft Corporation, SAP AG, Siebel Systems*, Mar. 31, 2003, 85 pages.

Christensen, E. et al., Web Services Description Language (WSDL) 1.1, *Ariba, International Business Machines Corporation, Microsoft* ©, Jan. 2001, 45 pages.

Curbera, F. et al., "Unraveling the Web Services Web: An Introduction to SOAP, WSDL, and UDDI", *IEEE Internet Computing*, 2002, 6(2), 86-93.

Lee, Y.N. et al., "Solving the Convoy Movement Problem Using Branch-and-Bound on a Network of Transputers", *Transputer Applications and Systems*, 1994, 786-796.

Thatte, S., "XLANG-Web Services for Business Process Design", *Microsoft © Corporation*, 2001, 46 pages.

XSL Transformations (XSLT) Version 1.0, *W3C®*, Nov. 19, 1999, www.w3.org/TR/xslt, 102 pages.

XML Path Language (XPath) 2.0, *W3C®*, May 2, 2003, 205 pages.

XLANG/S-Language Specification, Version 0.55, *Microsoft © Corporation*, 1999-2002, 146 pages.

* cited by examiner

EFFICIENT PROCESSING OF A CONVOY WORKFLOW SCENARIO IN A MESSAGE DRIVEN PROCESS

FIELD OF THE INVENTION

The present invention generally relates to web services and more specifically relates to processing message traffic patterns occurring in business processes.

BACKGROUND OF THE INVENTION

Web services are used by businesses to interact via distributed environments, such as the Internet or World Wide Web. To ensure that these interactions are accomplished successfully, protocols must be in place for carrying messages to and from participants, and specific business applications must be in place at each participants end. These interactions, by their very nature are message driven. For example, a buyer sends a purchase order to a seller. The seller then checks its inventory to determine if it can provide the ordered items. The seller then sends an acknowledgement back to the buyer with a price. Finally, the buyer then accepts or rejects the sellers offer (and possibly places another order). As evident in this example, each participant's business application reacts to the receipt of messages. Also illustrated in this example is that these types of web service transactions may take place over long periods of time. Further, each participant may conduct activities at its end, such as tracking messages and updating the status of each activity.

In order for businesses to use web services, the web services should be user friendly. That is, complex, intricate programming steps should be transparent to the participant. The participant should be able to generate high level business applications utilizing nomenclature and concepts familiar to the participant and normally used in the specific business. However, this may be difficult in scenarios in which the sequence and/or timing of incoming and outgoing messages are not known prior to receipt and/or transmission. Convenient, user friendly, techniques for processing specific web service scenarios, which do not require a participant to be intimately familiar with the complex processing steps necessarily to ensure proper execution of the message driven web service is desired.

SUMMARY OF THE INVENTION

In an exemplary embodiment of the present invention, processing of specific scenarios encountered in web services, know as convoy scenarios, provides an application designer or programmer of a workflow application with an efficient and relatively simple mechanism for handling convoy scenarios without having to write and/or be knowledgeable of the intricate processing steps needed to ensure proper execution. There are two broad classes of convoy scenarios; parallel convoys and sequential convoys. A parallel convoy scenario expects two or more messages (possibly of different messagetypes) to be received in parallel (possibly simultaneously) while initializing a correlation. A sequential convoy scenario expects two or more messages to be received in (a possibly unspecified) order where the first receive (first in the sense of instruction order) initializes a correlation and the subsequent receives follow the correlation (viz., only receive a message with property values set to match the correlation). Values within specific fields (viz., properties) of the related messages are not known before the first message is received. Therefore receipt of the first message defines the nature of the relationship of the related messages. Succeeding messages in the group may arrive before any further processing or synchronization takes place, and all messages in the group are processed by the same handler.

To process convoy scenarios, a workflow application is statically analyzed to determine if any convoy scenarios exist. If a convoy scenario, or scenarios, exists, it is classified in accordance with one of at least three convoy classes. These classes include parallel, uniform sequential, and non-uniform sequential convoy classes. A runtime environment is generated that handles messages belonging to a convoy class in accordance with the respective convoy class. The runtime environment is generated in accordance with specialized semantics utilized for each convoy class.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

Figure 1:
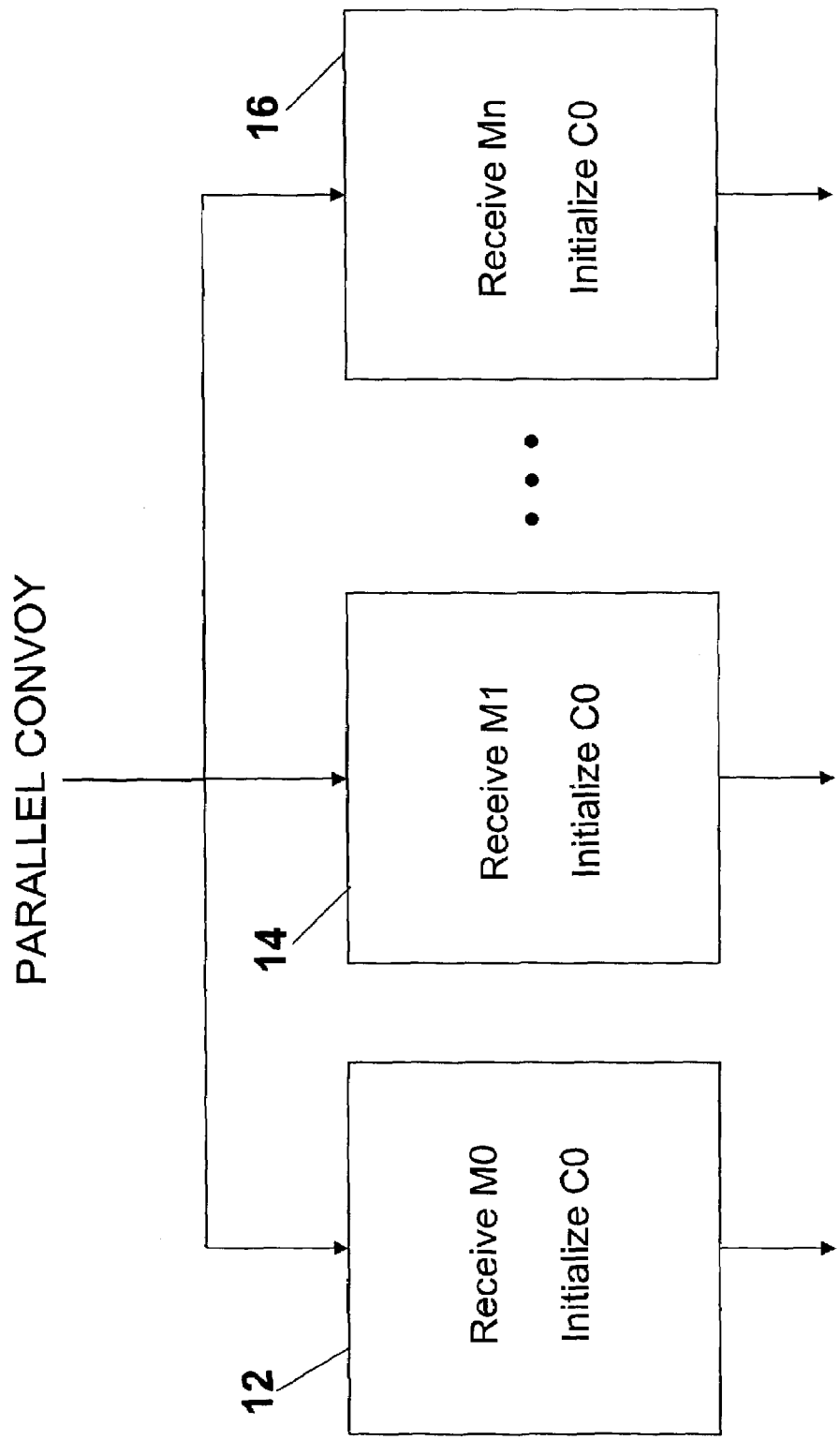
FIG. 1 is an illustration of a parallel convoy scenario, in accordance with an exemplary embodiment of the present invention.

Processing convoy scenarios as described herein provides an application designer or programmer of a workflow application with an efficient and relatively simple mechanism for handling convoy scenarios without requiring the programmer or application designer to write and/or be knowledgeable of the intricate processing steps needed to handle convoy scenarios. As described in more detail below, a workflow application is generated using declarative statements indicating that incoming messages are related in some manner. Identifiers (e.g., tokens) embedded in declarative statements, such as receive operations, of the workflow application indicate that messages received with the same type of identifier are a member of a particular convoy class. At compile time, the workflow application is statically analyzed to determine if convoy scenarios exist, in part by searching for these identifiers. If it is determined that convoy scenarios exist, the convoy scenarios are classified as belonging to one of several types of convoy classes. The messages of each convoy class are processed in a manner tailored to the specific class. The handling/processing of convoy scenarios is transparent to the workflow application designer/programmer. The techniques described herein are directed to workflow applications and compilers related to the XLANG/s language used to perform web services based business process operations. However, these convoy processing techniques are not limited to implementations in the XLANG/s language. These convoy processing techniques may be applied to any asynchronous transactional messaging language. The XLANG/s language is simply an example of an asynchronous transactional messaging language. To facilitate an understanding of convoy scenarios, a brief introduction to web services and the XLANG/s language are provided below.

Introduction to Web Services

Businesses, today more then ever, are interacting via distributed environments, such as the Internet or World Wide Web. For example, a user may want to know the prices of rental cars for an upcoming trip. The user may request these prices through an intermediate business on the Internet. The intermediate business, upon receiving the user's request, will send requests to a variety of rental car businesses. After responses are received, the intermediate business will then send the results to the user. The user will then reserve a car and pay for the reservation via the intermediate business. Web services are utilized to facilitate these types of interactions. Web services facilitate the exchange of messages between participants in a distributed environment. Web services technology includes, among other things, communication protocols to facilitate communication between different businesses on the network, and description and discovery standards built around these protocols. At each participant's end, messages must be tracked and processed in accordance with each participant's requirements. A language designed to automate business processes based on web services is XLANG/s. XLANG/s facilitates tracking of messages, processing of incoming and outgoing messages, and enforces adherence to protocol standards.

Introduction to XLANG/s

XLANG/s is described in more detail in a document titled "XLANG/S Language Specification", Version 0.55, Copyright © Microsoft 1999-2000, and a document titled "XLANG Web Services For Business Process Design, Satish Thatte, Copyright Microsoft Corporation 2001, both of which are hereby incorporated by reference in their entirety as if presented herein. XLANG/s is a language that describes the logical sequencing of business processes, as well as the implementation of the business process by using various technology components or services. The XLANG language is expressed in Extensible Markup Language (XML). The XLANG/s Language is a modem, special purpose language used to describe business process and business protocol. It is a declarative language, and as such it defines an explicit instruction set describing and implementing steps in a business process, the relationship between those steps, their semantics, and interactions. Because of its declarative nature and specific semantics, the resulting executable code is deterministic; that is, the behavior of the running business process is well defined by the semantics of the collection of XLANG/s instructions. The definitions of these business processes in executable form are called orchestrations.

XLANG/s is compatible with many internet standards. XLANG/s is designed to use XML, XSD (XML Schema Definition), XSLT (XSL Transformations), XPATH (XML Path Language), and WSDL (Web Services Description Language) as supported standards and has embedded support for working with .NET based objects and messages. WSDL is described in a document titled "Web Services Description Language (WSDL) 1.1", W3C Note January 2001, by Microsoft and IBM Research, Copyright © 2000 Ariba, International Business Machines Corporation, Microsoft, which is hereby incorporated by reference in its entirety as if presented herein. The XLANG/s language is syntactically similar to C#, thus a C# specification may be referenced as an aid to understanding the exact syntax. The semantics embodied in XLANG/s are a reflection of those defined in a document titled "Business Process Execution Language for Web Services", Version 1.1, dated Mar. 31, 2003, published by Microsoft, IBM, and BEA for the definition of Business Process semantics, which is hereby incorporated by reference in its entirety as if presented herein. The Business Process Execution Language for Web Services specification is commonly referred to as the BPEL4WS specification. The use of XLANG/s is most advantageous when applied to a business process.

The XLANG/s language defines a rich set of high-level constructs used to define business processes. XLANG/s also supports low-level data types such as string and int for example. High-level data-types are also defined such as messages, ports (locations to which messages are sent and received), correlations, and service links. These data-types are used to rigorously define the semantics associated with the business process. These data-types are complemented by process control statements such as 'if/else if/else', 'while', and 'scope' (including transactional scopes, for both longrunning and atomic transactions).

A XLANG/s service communicates with the outside world by sending and/or receiving messages. The message type is the structural definition of such a communication entity. Messages are acted upon by operations (e.g., receive, response). An operation may be a single asynchronous message, or a request/response pair of messages. Operations may be either incoming or outgoing. For example, a seller may offer a service/product that begins an interaction by accepting a purchase order (from a potential buyer) via an input message. The seller may then return an acknowledgement to the buyer if the order can be fulfilled. The seller may send additional messages to the buyer (e.g., shipping notices, invoices). Typically, these input and output operations occur in accordance with a defined sequence, referred to as a service process. The seller's service remembers the state of each purchase order interaction separately from other similar interactions. This is particularly advantageous in situations in which the buyer may be conducting many simultaneous purchase processes with the same seller. Also, each instance of a service process may perform activities in the background (e.g., update inventory, update account balance) without the stimulus of an input operation.

A service process may represent an interaction utilizing several operations. As such the interaction has a well-defined beginning and end. This interaction is referred to as an instance of the service. An instance can be started in either of two ways. A service can be explicitly instantiated using some implementation-specific functionality or a service can be implicitly instantiated with an operation in its behavior that is meant to be an instantiation operation. A service instance terminates when the process that defines its behavior terminates.

Services are instantiated in order to act in accordance with the history of an extended interaction. Messages sent to such services are delivered not only to the correct destination port, but to the correct instance of the service that defines the port. A port is an end point where messages are sent and received by a service. The infrastructure hosting the service supports this routing, thus avoiding burdening every service implementation with the need to implement a custom mechanism for instance routing.

For example, consider a typical supply chain situation in which a buyer sends a purchase order to a seller. Assume the buyer and seller have a stable business relationship and are statically configured to send documents related to the purchasing interaction to the URLs associated with the relevant ports. When the seller returns an acknowledgement for the order, the acknowledgement is routed to the correct service instance at the buyer's end. One way to implement this is to carry an embedded token (e.g., cookie) in the order message that is copied into the acknowledgement for correlation. The token may be in the message envelope in a header or in the business document (purchase order) itself. As described in more detail below, in an exemplary embodiment of the present invention, tokens indicative of convoy classes are utilized. The structure and position of the tokens in each message can be expressed declaratively in the service description. This declarative information allows XLANG/s compliant infrastructure to use tokens to provide instance routing automatically.

During its lifetime, a service instance may typically hold one or more conversations with other service instances representing other participants involved in the interaction. Conversations may use a sophisticated transport infrastructure that correlates the messages involved in a conversation and routes them to the correct service instance. In many cases correlated conversations may involve more than two parties or may use lightweight transport infrastructure with correlation tokens embedded directly in the business documents being exchanged. Correlation patterns can become quite complex. For example, a buyer may start a correlated exchange with a seller by sending a purchase order (PO) and using a PO number embedded in the PO document as the correlation token. The PO number is used in the PO acknowledgement by the seller. The seller may later send an invoice that carries both the PO number, to correlate it with the PO, and also an invoice number so that future payment related messages that need carry only the invoice number as the correlation token. The invoice message thus carries two separate correlation tokens and participates in two overlapping correlated exchanges.

XLANG/s addresses correlation scenarios by providing a very general mechanism to specify correlated groups of operations within a service instance. A set of correlation tokens can be defined as a set of properties shared by all messages in the correlated group. Such a set of properties is called a correlation set. The set of operations (in a single service) that is correlated via a correlation set is called a correlation group. A given operation may participate in multiple correlation groups. In an instance of a correlation group, the actual values of the properties in the associated correlation set must be identical for all the actual messages in all the operations involved in the instance. A particular operation may refer to one or more correlation sets. The structure and position of the correlation tokens in each message can be expressed declaratively in the service description (viz., source code). The declarative information allows XLANG/s compliant infrastructure to use correlation tokens to provide instance routing automatically. In an action, when a reference is made to an operation that carries correlation information, the action indicates this by supplying a correlation set reference (viz., correlation sets are used declaratively).

Convoy Scenarios

In an exemplary embodiment of the present invention, advanced workflow programming environments (e.g., such as those implemented in XLANG/s) provide comprehensive and powerful facilities to correlate incoming messages to workflow instances. Certain patterns of use of these correlation facilities are known as "convoy" patterns. From a web services participant's viewpoint, convoy patterns appear to be treated as if received in a single threaded (a.k.a. convoy) fashion in order to achieve correct execution. A convoy scenario is defined by a correlation set initialized on a receive operation which is input to a subsequent receive operation. The compiler detects convoy scenarios by analyzing the control and dataflow of an XLANG/s program. For example, a message may contain a field, or set of fields, in which values identify the message as a member of a group of related messages. These fields may be indicative of, for example, a unique purchase order number, or a social security number. A convoy scenario is one in which the values of the information in these fields is not known before the arrival of the first message. Thus, the first message "defines" the group. Also, in a convoy scenario, succeeding messages in the group may arrive before any further processing or synchronization takes place. Thirdly, all messages in the group are to be processed by the same handler (e.g., same instance of a process). Three types, or classes, of convoy scenarios are described. One class is referred to as a parallel convoy, a second class is referred to as a sequential uniform convoy class, and the third class is referred to as a non-uniform convoy class.

FIG. 1 is an illustration of an exemplary parallel convoy scenario. In a parallel convoy scenario, messages, indicated as M0, M1, . . . , Mn, may arrive in any order. That is, the relative arrival times of incoming messages M0, M1, . . . , Mn, are not defined. The correlation involved in the convoy is indicated by C0. For example consider a clearinghouse for stock purchases—the seller expects to receive a sum of money in exchange for a stock certificate and the buyer expects to receive the stock certificate in exchange for a sum of money. There are clearly two distinct messagetypes here; one describing the money and one describing the stock. From the clearinghouse point-of-view, for a given transaction id they are receiving both a stock certificate and a sum of money to pay for it. It is unknown which message will be received first, but the first one received initializes the correlation representing transaction id, so that the second one will be routed to the correct transaction id, viz. the second message follows the already initialized correlation. The XLANG/s source code could take the form:

```
module clearingHouse {
    public messagetype stockMT {
        // XSD Schema describing stock with Int32 property
        transactionID
        XSDStockDescriptor stockVal;
    };
    public messagetype moneyMT {
        // XSD Schema describing money with Int32 property
        transactionID
        XSDPaymentDescriptor moneyVal;
    };
    porttype clearingHousePT {
        oneway stockOp { stockMT };
        oneway moneyOp { moneyMT };
    };
    correlationtype transactionCT {
        transactionID // property shared by XSDStockDescriptor
        and XSDPaymentDescriptor
    };
    public service Transaction {
        message stockMT stock;
        message moneyMT money;
        port implements clearingHousePT cHPort;
        correlation transactionCT xID;
        body {
            parallel {
```

-continued

```
    task {
        activate receive(cHPort.stockOp, stock,
            initialize xID);
    }
    task {
        activate receive(cHPort.moneyOp, money,
            initialize xID);
    }}
  }
}
```

The incoming messages are accepted in the order received, but are processed in parallel. When messages are processed in parallel, multiple branches (e.g., branches 12, 14, and 16) of a business process are processed concurrently. All branches complete processing before any statements following the parallel are executed. In XLANG/s, the parallel statement executes each of the specified tasks concurrently (or at the very minimum in an indeterminate order). The statement is completed when all the tasks of the parallel are completed.

In a parallel convoy scenario, receive statements on at least two different tasks of a parallel are correlated to each other. An example of a parallel convoy scenario in XLANG/s is an activation scenario. In the activation scenario, multiple messages received in the parallel tasks arrive in non-deterministic order. The first received message activates an instance of the XLANG/s process. The other parallel messages are received by the same instance based on their shared correlation values. Thus, actual activation occurs for only one of the set of parallel correlated messages. XLANG/s statements designed to handle parallel convoy scenarios are written in accordance with specific specialized semantics. If one of the tasks of a parallel process has an activatable-receive statement as the first statement, all of the tasks of that parallel process have an activatable receive statement as the first statement. Also, these activatable-receive statements initialize exactly the same correlation sets. More generally, anytime that receive statements appearing on different tasks of a parallel are initializing exactly the same correlation sets, they can be marked as to the convoy class and subject to this semantic specialization. The receive statements share the actual correlation values, and subsequent to the first receive statement initializing the correlation values, all the subsequent receives will receive messages containing exactly the same correlation values. In another semantic specialization, if a particular correlation is initialized on more than one task of a parallel by a receive statement, each of the concerned receive statements initialize exactly the same correlations. Note that even though permitting multiple receive statements on different tasks of a parallel process to initialize a particular correlation set appears to violate the earlier semantic specialization of not allowing a correlation set to be initialized multiple times, this is truly not the case. The latter semantic specialization states that even though the correlation sets appear to be initialized multiple times, the correlation sets are bound to a specific set of values upon the first initialization.

Figure 2:
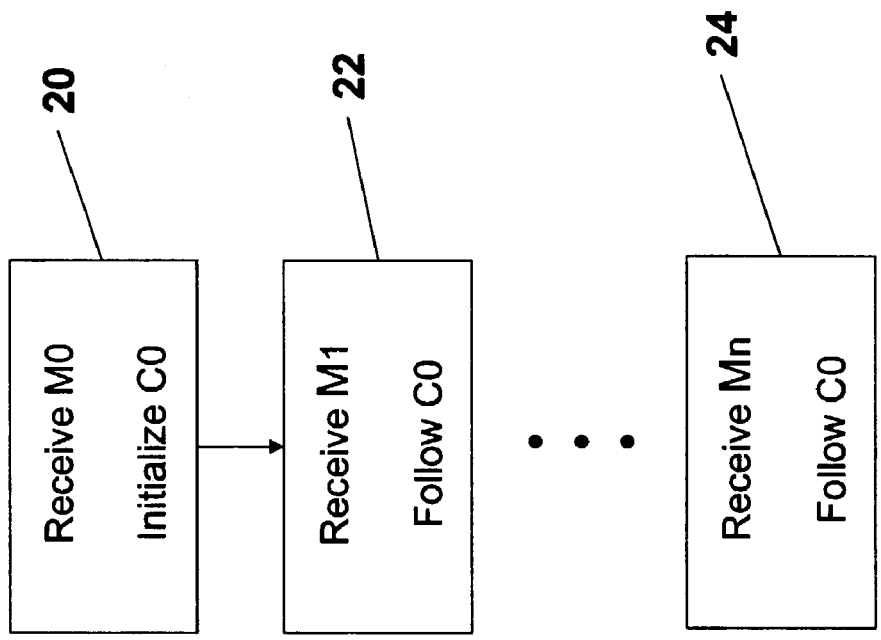
FIG. 2 is an illustration of a sequential convoy scenario (either uniform or non-uniform), in accordance with an exemplary embodiment of the present invention.

FIG. 2 is an illustration of an exemplary sequential convoy scenario (both uniform and non-uniform). In a non-uniform convoy scenario, messages, indicated as M0, M1, . . . , Mn, are expected to be received in a predefined order. The message types may be different; in fact, a uniform convoy scenario requires that the messagetypes are the same, but a non-uniform scenario requires that the messagetypes are not the same. The messages and associated correlations (e.g., 20, 21, and 24) are processed in the order received, which is expected to be in the predefined order. The non-uniform sequential convoy class comprises sequential receive operations waiting for different types of documents. The first receive operation initializes the correlation set C0, and subsequent receive operations use the correlation set defined by the first to route messages to the respective business process.

An example of a non-uniform convoy scenario is an inventory order schedule that places an order for a widget and receives a notice when the widget has shipped, initializing a correlation representing the order number and then receives an invoice for the widget, which is routed to the correct order number (viz., follows the already initialized order number correlation). Since the messagetypes are different, the widget shipping notice must be received before the invoice. This requires that the service sending the messages actually sends them in the correct order and it requires that message processing does not change that order. To enforce ordered delivery in message processing the OrderedDeliveryAttribute is added to the port declaration. The XLANG/s source code could take the form:

```
module orderTool {
    public messagetype shipNoticeMT {
        // XSD Schema with only Int32 property orderID
        XSDShipNoticeDescriptor ackVal;
    };
    public messagetype invoiceMT {
        // XSD Schema describing money with Int32 property orderID
        XSDInvoiceDescriptor invoiceVal;
    };
    porttype orderToolPT {
        oneway shipOp { shipNoticeMT };
        oneway invoiceOp { invoiceMT };
    };
    correlationtype orderNumberCT {
        orderID // property shared by XSDShipNoticeDescriptor and
        XSDInvoiceDescriptor
    };
    public service Order {
        message shipNoticeMT shipAck;
        message invoiceMT invoice;
        [ Microsoft.XLANGs.BaseTypes.OrderedDeliveryAttribute ]
        port implements orderToolPT orderPort;
        correlation orderNumberCT xID;
        body {
            activate receive(orderPort.shipOp, shipAck, initialize xID);
            receive(orderPort.invoiceOp, invoice, xID);
        }
    }
}
```

Referring again to FIG. 2, in a uniform convoy scenario, messages, indicated as M0, M1, . . . , Mn, may be received in any order. However, the messages types must be the same. The messages and correlations are processed sequentially in the order received. The first receive operation initializes the correlation set, and the second receive operation use the correlation values defined by the first receive operation to route the documents to the respective business processes. An example of a uniform convoy scenario involves an insurance company medical claim center. For a given injury on a given insured, an incident ID is formed and all medical claims for that injury are routed using that incident ID. For the sake of simplicity we'll assume that there are two claims for any injury—the hospital bill and the doctor bill. Obviously it is unknown which will arrive first. The first one to be received initializes the incident ID correlation, so that the second one coming in will be routed to the correct incident ID by following the already initialized correlation. The XLANG/s source code could take the form:

```
module insuranceClaim {
    public messagetype claimMT {
        // XSD Schema describing claim with Int32 property incidentID
        XSDClaimDescriptor claimVal;
    };
    porttype claimPT {
        oneway claimOp { claimMT };
    };
    correlationtype incidentCT {
        incidentID // property carried by XSDClaimDescriptor
    };
    public service Claim {
        message claimMT claim;
        port implements claimPT claimPort;
        correlation incidentCT xID;
        body {
            // receive first claim (either doctor or hospital)
            activate receive(claimPort.claimOp, claim, initialize xID);
            // receive other claim (either doctor or hospital)
            receive(claimPort.claimOp, claim, xID);
        }
    }
}
```

XLANG/s statements designed to handle sequential convoy scenarios, including the uniform sequential convoy class and the non-uniform sequential convoy class, are written in accordance with specific specialized semantics. Two such semantic specializations that apply to both the uniform sequential convoy class and the non-uniform sequential convoy class include: (1) receive operations causing another receive operation to be fully-defined initialize all the correlation sets for which the second receive operation is a follower (e.g., all the non-initialized correlation sets for the second receive operation are initialized by the first receive operation); and (2) the second receive operation occurs on the same port or service-link as the first receive operation. A third semantic specialization that applies to the uniform sequential convoy class is that the second receive operation receives the same message type as that of the first receive operation. A receive operation is fully defined when all of the correlation sets for which the receive operation is a follower have been initialized and the port or service-link has been definitely assigned. A receive operation is not fully defined when all the correlation sets for which the receive activity is a follower have not been initialized or the port or service-link has not been initialized.

For all of the above mentioned receive operations a processor, such as an XLANG/s compiler, generates a runtime subscription which identifies the respective type of convoy correlation set and its associated message properties.

Subscriptions associated with a convoy correlation set lookup the respective business process using the correlation values supplied by the message properties and create a new instance of the correlation set if no business process is associated with the respective correlation set. During subscription creation default values may be associated with a particular correlation set in the situation in which no convoy correlation message properties are associated with the messages. This approach is used to route all messages destined to a particular remote queue to the business processes, or service an instance by forwarding the messages in the order received, for example.

The XLANG/s runtime constructs a subscription for each receive statement in an XLANG/s program and enters it into the routing system. The activate subscriptions are created when the program is "enlisted", that is at a time before the first execution of the program—since the program must have its activation subscriptions created before it can be activated. All instances of the program will make use of these subscriptions. Non-activation subscriptions are specific to an instance and are normally not created until the subscription's dependent correlation sets are initialized during the course of instance execution.

Subscriptions for convoy receives are handled differently. At program enlistment each of the convoy sets is assigned a unique identifier, a convoy set id, and supplied to the routing system as a set of properties. Each program convoy that contains an activation receive has all of its subscriptions (activation and non-activation) created at this time. All these subscriptions are marked with the corresponding ConvoySetID.

If the convoy does not include any activation receives then the subscriptions are generated at instance execution. The receives in each convoy may include a group of correlation sets that are part of the convoy and a group that are not a part. After the correlation sets that are not part of the convoy are initialized, the subscriptions for the convoy are created. All the properties in the initialized correlation sets become the predicates of the subscriptions. Each subscription is marked with the proper ConvoySetID. The subscription for the receive that is initializing the convoy is marked with CanInitializeConvoySet=True. For parallel convoy cases there may be multiple initializing subscriptions, in which case all are so marked.

During instance execution one or more of the correlation sets that define a convoy may go out of scope. When this occurs the XLANG/s runtime deletes the subscriptions and the convoy instance associated with the corresponding convoy id. If the scope is later re-entered the subscriptions are re-created.

For a parallel convoy, an exemplary convoy set and two subscriptions are provided below.

```
<ConvoySet Identifier = convoySet1 >
        </ConvoyPredicate PropertyName = transactionID>
</ConvoySet>
<Subscription
    Identifier = subscription1 ServiceID = clearinghouse.Transaction ServiceInstanceID
    = null ConvoySetId = convoySet1 CanInitializeConvoySet = True >
        <PredicateGroup>
            <AndGroup>
                </Predicate PropertyName = MessageType Value= StockMT
                    Comparison = Equals >
```

```
            </AndGroup>
        </PredicateGroup>
</Subscription>
<Subscription
    Identifier = subscription2 ServiceID = clearinghouse.Transaction ServiceInstanceID
= null ConvoySetId = convoySet1 CanInitializeConvoySet = True >
        <PredicateGroup>
            <AndGroup>
                </Predicate PropertyName = MessageType Value= MoneyMT
                    Comparison = Equals >
            </AndGroup>
        </PredicateGroup>
</Subscription>
```

For a non-uniform sequential convoy, an exemplary convoy set and subscriptions are provided below.

```
<ConvoySet Identifier = convoySet2 >
        </ConvoyPredicate PropertyName = orderID>
</ConvoySet>
<Subscription
    Identifier = subscription3 ServiceID = orderTool.Order
        ServiceInstanceID = null
ConvoySetId = convoySet2 CanInitializeConvoySet = True >
        <PredicateGroup>
            <AndGroup>
                </Predicate PropertyName = MessageType Value=
                    shipNoticeMT Comparison = Equals >
            </AndGroup>
        </PredicateGroup>
</Subscription>
<Subscription
    Identifier = subscription4 ServiceID = orderTool.Order
        ServiceInstanceID = null
ConvoySetId = convoySet2 CanInitializeConvoySet = False >
        <PredicateGroup>
            <AndGroup>
                </Predicate
                    PropertyName = MessageType Value= invoiceMT
                        Comparison = Equals>
            </AndGroup>
        </PredicateGroup>
</Subscription>
```

For a uniform sequential convoy, an exemplary convoy set and subscriptions are provided below.

```
<ConvoySet Identifier = convoySet3 >
        </ConvoyPredicate PropertyName = incidentID>
</ConvoySet>
<Subscription
    Identifier = subscription5 ServiceID = insuranceClaim.Claim
        ServiceInstanceID =
null ConvoySetId = convoySet3 CanInitializeConvoySet = True >
        <PredicateGroup>
            <AndGroup>
                </Predicate PropertyName = MessageType Value=
                    claimMT Comparison = Equals >
            </AndGroup>
        </PredicateGroup>
</Subscription>
<Subscription
    Identifier = subscription6 ServiceID = insuranceClaim.Claim
        ServiceInstanceID =
null ConvoySetId = convoySet3 CanInitializeConvoySet = False >
        <PredicateGroup>
            <AndGroup>
                </Predicate
                    PropertyName = MessageType Value= claimMT
                        Comparison = Equals>
```

```
            </AndGroup>
        </PredicateGroup>
</Subscription>
```

A subscription includes a vector of properties specific to the routing system and a set of related predicates. A subscription typically includes the identifier for the owning service, as well as a service instance identifier if the subscription routes to a specific instance of the service. The set of related predicates are evaluated against the properties of a message or set of messages to determine whether or not that subscription has evaluated to true. Subscriptions are used to route messages which start new instances of a service. Subscriptions are also used to correlate messages to an existing instance of a service (e.g., the purchase order scenario). As described herein, a subscription that starts a new instance of a service is known as an activation subscription and a subscription that routes messages to an existing instance is known as an instance subscription. An instance subscription is identified by noting that the service instance ID on the subscription property vector is not null.

Sample XML text for a subscription is provided below.

```
<Subscription
    Identifier = [id] ServiceID = [ServiceID] ServiceInstanceID =
        [ServiceInstanceID] . . .
>
        <PredicateGroup>
            <AndGroup>
                </Predicate
                    PropertyName = [Name] Value= [Value]
                        Comparison = [Comp]
                >
                </Predicate
                    PropertyName = [Name] Value= [Value]
                        Comparison = [Comp]
                >
                </Predicate
                    PropertyName = [Name] Value= [Value]
                        Comparison = [Comp]
                >
            </AndGroup>
            <AndGroup>
                </Predicate
                    PropertyName = [Name] Value= [Value]
                        Comparison = [Comp]
                >
                </Predicate
                    PropertyName = [Name] Value= [Value]
                        Comparison = [Comp]
                >
```

```
        </Predicate
            PropertyName = [Name] Value= [Value]
            Comparison = [Comp]
        >
    </AndGroup>
  </PredicateGroup>
</Subscription>
```

For correlation sets whose correlation tokens are known at the time of subscription creation, the correlation set comprises a set of predicates. If the predicate evaluates to true, then the message is routed to an existing instance based upon the instance ID of the subscription property vector. In order to support convoys, the underlying routing subsystem supports correlation sets whose values are known when the subscription is created, and also supports incomplete correlation sets wherein the values will be filled in when the first message is routed (to one of the convoy receives). These incomplete correlation sets, referred to as convoy sets, are preferably shared across subscriptions so that one subscription can initialize a convoy set which other subscriptions subsequently use. In one embodiment, to support this type of sharing, a convoy set is considered to be a separate, yet related, entity from the subscription.

Sample XML text of a convoy set is provided below.

```
<ConvoySet Identifier = [id] >
    </ConvoyPredicate PropertyName = [Name] >
    </ConvoyPredicate PropertyName = [Name] >
    </ConvoyPredicate PropertyName = [Name] >
</ConvoySet>
<Subscription
    Identifier = [id] ServiceID = [ServiceID] ServiceInstanceID =
    [ServiceInstanceID] ConvoySetID = [ConvoySetID]
    ...>
    <PredicateGroup>
        ...
    </PredicateGroup>
</Subscription>
```

A convoy set comprises an identifier and a set of property names without values. The vector <convoy set id, convoy set property value1, convoy set property value2, . . . , convoy set property valueN, service instance id> is referred to as an instance of the convoy set. This vector is initialized whenever a message is routed to a subscription which is associated with a convoy set, but the message property values associated with the convoy set properties do not correspond to any existing convoy set instance. When this occurs, a new instance of the convoy set is created and any other subscriptions which are associated with this convoy set will have access to it. The combination of convoy set id and convoy set property values making up the convoy set instance are unique. This constraint can be imposed by using any type of locking system before adding the new convoy set instance. In one embodiment, database unique constraints are used on this combination, however other locking enforcements are appropriate. For subscriptions not containing a service instance id, the convoy set instance simply generates a new id.

Sample XML text of a convoy set instance and convoy set id is provided below.

```
<ConvoySetInstance ConvoySetID = [id] ServiceInstanceID =
[ServiceInstanceID] >
    </Predicate PropertyName = [Name] Value = [Value] Comparison =
    Equals >
    </Predicate PropertyName = [Name] Value = [Value] Comparison =
    Equals >
    </Predicate PropertyName = [Name] Value = [Value] Comparison =
    Equals >
</ConvoySet>
```

Note that the above XML text compares convoy set properties to determine if they are equal. It is to be understood that other comparison operators may be utilized.

Sequential convoys are distinguished from parallel convoys. A mechanism is provided to allow subscription creators to specify whether all subscriptions using a specific convoy set can initialize the convoy set instance or whether only one can initialize the convoy set instance. In one embodiment, this mechanism comprises a flag on the subscription property vector indicating whether or not the convoy set can be initialized by this subscription.

Sample XML text illustrating this identification flag is provided below.

```
<Subscription
    Identifier = [id] ServiceID = [ServiceID] ServiceInstanceID =
    [ServiceInstanceID] ConvoySetID = [ConvoySetID]
    CanInitializeConvoySet = [True/False]
    ...>
    <PredicateGroup>
        ...
    </PredicateGroup>
</Subscription>
```

For a parallel convoy, each subscription is linked to the same convoy set and all subscriptions are marked as CanInitializeConvoySet=True. This allows any message to start the service instance which would subsequently process all related messages. For a sequential convoy only the first subscription is marked as CanInitializeConvoySet=True. This enforces the ordered delivery of messages based upon the protocol described in the service language, in this case, XLANG/s. From the routing subsystems standpoint, there is no difference in uniform versus non-uniform sequential convoys as the uniformity is simply reflected in the predicates of the subscription.

Figure 3:
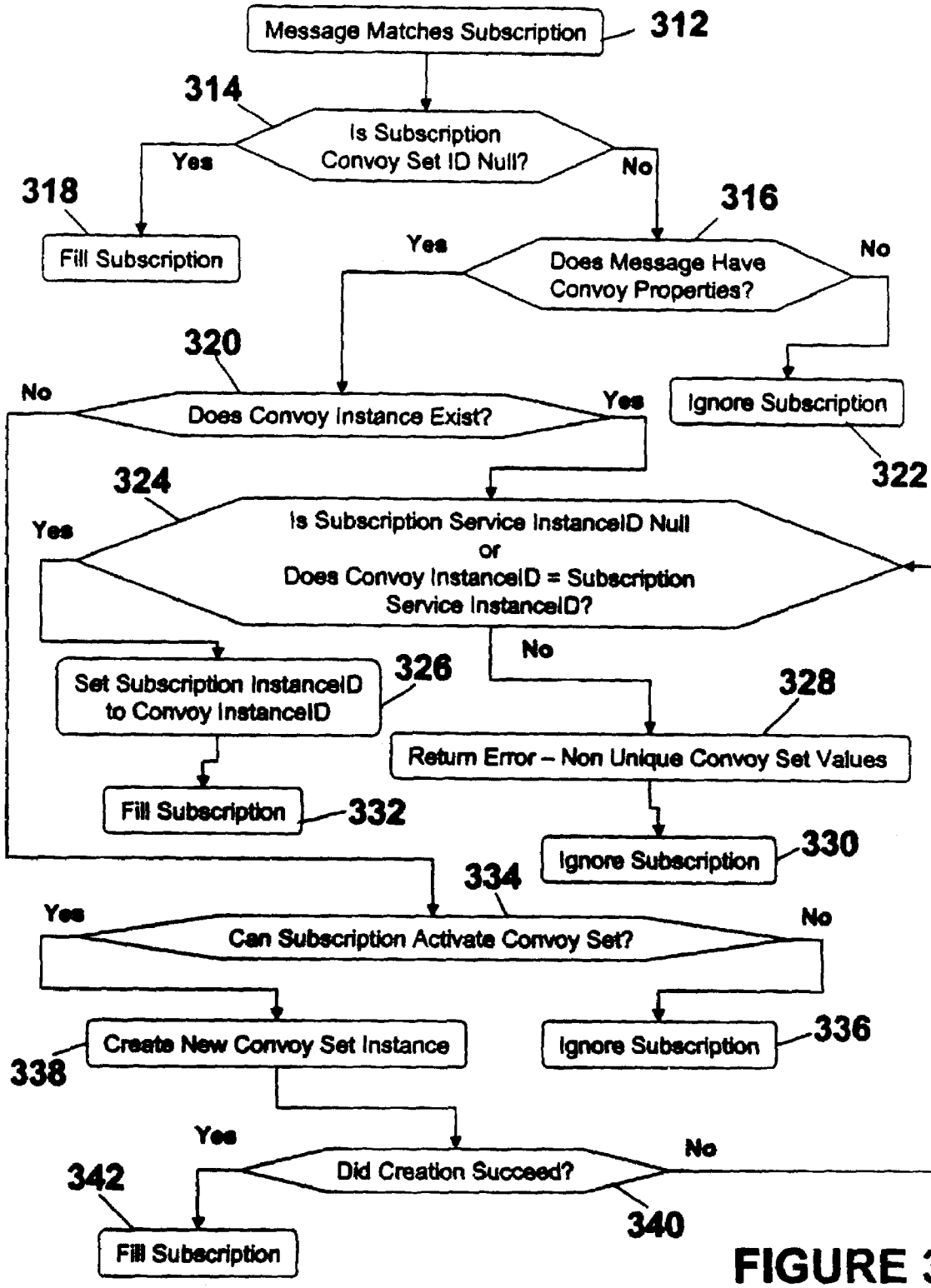
FIG. 3 is a flow diagram of an exemplary process for processing subscriptions and convoys in accordance with an embodiment of the present invention.

FIG. 3 is a flow diagram of an exemplary process for processing subscriptions and convoys in accordance with the present invention. At step 312, a subscription is matched when the properties of a message are found to match the predicates of a subscription (e.g., a user subscribes to MessageType=PurchaseOrder, so if a message is published whose type is PurchaseOrder, the subscription will be matched). After finding a matching subscription, it is determined at step 314 if the owner of the subscription associated a convoy set with the subscription. This is accomplished by checking to see if the convoysetid property of the subscription property vector is NULL. If the convoy set id property is NULL, then there is no associated convoy set and the subscription is filled at step 318. Filling the subscription implies notifying the instance of the service which subscribed to the message that a message has arrived which matches their subscription and providing a mechanism for retrieving the message as well as a copy of the entire subscription property vector associated with the subscription which routed the message. A copy is provided because, in the case of activation subscriptions, the new service's instance id will be generated as part of the routing mechanism and the information is passed to the new service instance. This is desirable because to handle convoys one needs to set the instance id at the time the convoy instance is created and at that point the service instance does not actually exist. If this is an activation subscription, this notification causes the creation of the new instance.

Returning to step 314, if the convoy set id is not NULL, implying that the subscription is associated with a convoy set, then it is determined if this message has the properties required by the convoy set as defined by the ConvoyPredicates, at step 316. If the message does not have the properties required by the convoy set, it can not fill this subscription and so this subscription is ignored at step 322 and the service instance is not notified. If the message does have the properties required by the convoy set (step 316), a search of the list of existing convoy set instances is then conducted at step 320. The search looks for any existing instances that have the same convoy set id and whose convoy set property values correspond to the values associated with this message. For example, if a convoy set with ID=10 is on PurchaseOrderID and this message has PurchaseOrderID=1274, the process would search for convoysetid=10 and PropertyValue[0]=1274. If the convoy set instance corresponding to the values associated with the message has already been created (step 320), then the convoy set instance id is compared with the subscription service instance id at step 324 and the subscription service instance id is compared to NULL. If the convoy set instance id is the same as the subscription service instance id, or the subscription's service instance id is NULL, then, at step 326, the service instance id is set to be the convoy set instance id for the copy of the subscription property vector to be associated with this message. The subscription is then filled at step 332.

Returning to step 324, if the convoy set instance id is not the same as the subscription service instance id, and the subscription's service instance id is not NULL, then at step 328, an error is returned indicating that non-unique values for the correlation set have been used. Returning to step 320, if the convoy set instance does not exist the system determines whether this subscription is allowed to initialize the convoy set at step 334. If the subscription is not allowed to initialize the convoy then we ignore the subscription at step 336 and do not notify the service instance. If convoy set instance can be initialized (step 334), properties are set based upon whether the convoy is sequential or parallel at step 338. The system uses the property values associated with the message for the convoy set properties and the service instance id of the subscription as the convoy set instance id (if there is not service instance id on the subscription we simply generate a new id for the convoy set instance). At this stage, though, a certain level of locking is implemented to ensure that two users do not create the same convoy set instance. Various mechanisms for accomplishing this are envisioned. For example, in one embodiment, access to the entire list of convoy set instances is protected by a read/write lock so that only one user at a time can create a new convoy set instance. To implement this embodiment, the system would acquire write lock on the convoy set instances list and determine if the new instance exists. If the new instance does not exist, a new instance would be created and the write lock would be released. This level of locking, however, is the least granular and does not allow multiple users to simultaneously create convoy set instances for different convoy sets. Thus, in another embodiment, the lock is implemented using a database level unique constraint on the combination of convoy set instance id and property values. This allows the most granular level of locking possible so that even users trying to create new instances of the same convoy set can do so as long as the values differ from all other users creating new convoy set instances at that moment.

If the creation of the new convoy set instance succeeds (step 340), the subscription is filled at step 342. If the creation of the convoy set instance does not succeed (step 340), for example because another user already created this convoy instance, the process proceeds to step 324. Processing from step 324 is as described above.

Figure 4:
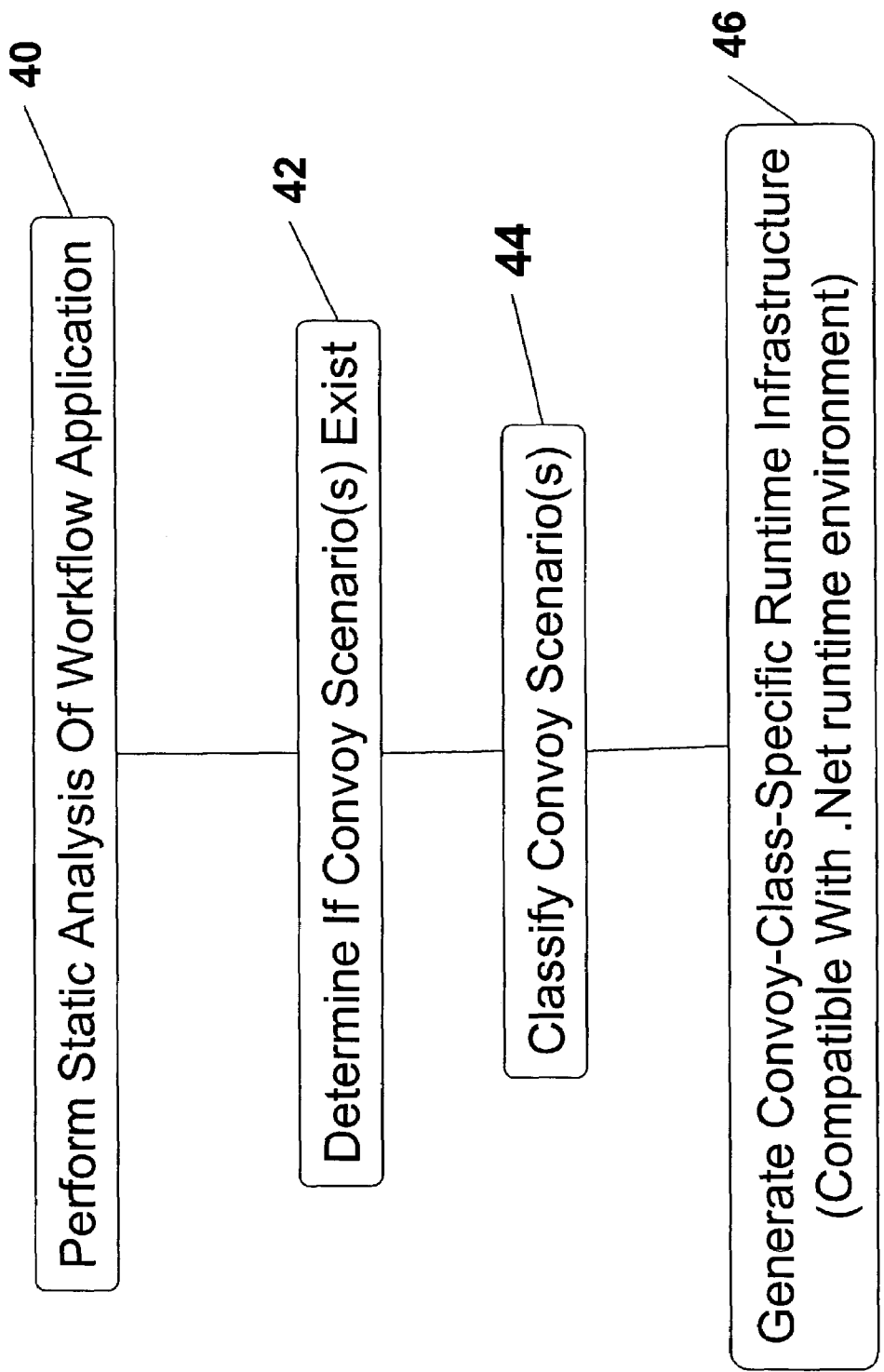
FIG. 4 is a flow diagram of an process for processing convoy scenarios, in accordance with an exemplary embodiment of the present invention.

FIG. 4 is a flow diagram of an exemplary process for processing convoy scenarios. At step 40, the workflow application is statically analyzed. The may be accomplished by any appropriate processor, such as an XLANG/s compiler for example. The workflow application is analyzed by searching for identifiers, such as tokens indicating that messages are related, and message types. At step 42, it is determined if a convoy scenario exists.

In one embodiment, the compiler detects convoy scenarios. When the compiler detects that a correlation set is initialized twice the compiler will issue an error, except if the following conditions hold:

1. Each initialization of the correlation set is in a different task of the same parallel statement.
2. Each initialization of the correlation set is in a receive statement.
3. If one of the initializing receives is activatable, then they all are and every task in the parallel must have an activatable receive initializing the same correlation set.
4. The group of correlation sets both initializing and following, must be the same in every receive.

5. Every initializing receive must be on the same port.

In which case, the compiler has found a parallel convoy.

Whenever the compiler detects that a correlation set is initialized in a receive statement it places that information in a dictionary, so that whenever a receive follows on a correlation set, the compiler looks in the dictionary to see if the correlation set is there indicating that it has been initialized in a receive and is a possible convoy. If there happens to be a send which follows on the same correlation set in between (in the sense of instruction order) the initializing and the following receive, then the convoy is said to be broken and convoy processing does not take place. However, in this case the onus is on the user to have a protocol on the other side of the pipe that sends and receives the messages in the instruction order. E.g.,

```
activate receive(claimPort.claimOp, claim, initialize xID);
send(ackPort.ackOp, ack, xID); // broken convoy
receive(claimPort.claimOp, claim, xID);
requires a counterpart of the form
    send(sendClaimPort.claimOP, claim, initialize xID);
    receive(receiveAckPort.ackOp, ack, xID);
    send(sendClaimPort.claimOP, claim);
```

If the protocol is in any other order, a model/protocol checking compiler pass will be able to diagnose that. Assuming now that a send does not intervene to break the convoy, then an error of an invalid convoy will be issued unless the following conditions:

1. All correlation set initializations must occur in a single receive, called the initializing receive.
2. The ports must be identical in all receive statements in the convoy.
3. The messagetypes must be identical in all receive statements in the convoy, unless the port is annotated with the OrderedDeliveryAttribute.
4. Every following receive must follow every correlation appearing in the initializing receive, unless the port is annotated with the OrderedDeliveryAttribute.

As described above, a convoy scenario may include a parallel convoy scenario, a sequential convoy scenario, or a combination thereof. At step 44, if it is determined that a convoy scenario, or scenarios, exits, the scenario(s) are classified into one of several convoy classes. As described above, convoy classes include a parallel convoy class, a uniform sequential convoy class, and a non-uniform sequential convoy class. At step 46, an infrastructure compatible with a runtime environment, such as the NET runtime environment, is generated. The convoy class infrastructure correlates messages with business process instances in accordance with convoy class of the messages.

This runtime environment is generated in accordance with the semantic specializations and rules described above to generate the workflow application. Thus, for messages belonging to the parallel convoy class, if the first statement of a task comprises an activatable-receive statement, then all of the tasks of that parallel process have an activatable receive statement as the first statement, these activatable-receive statements initialize exactly the same correlation sets, and if a particular correlation is initialized on more than one task to a receive statement, each of the concerned receive statements initialize exactly the same correlations. For uniform and non-uniform sequential convoy classes, receive operations causing another receive operation to be fully-defined initialize all the correlation sets for which the second receive operation is a follower, and the second receive operation occurs on the same port and/or service-link as the first receive operation. For uniform sequential convoy classes, the second receive operation receives the same message type as the first receive operation.

Overview of a Suitable Computing System Environment

Figure 5:
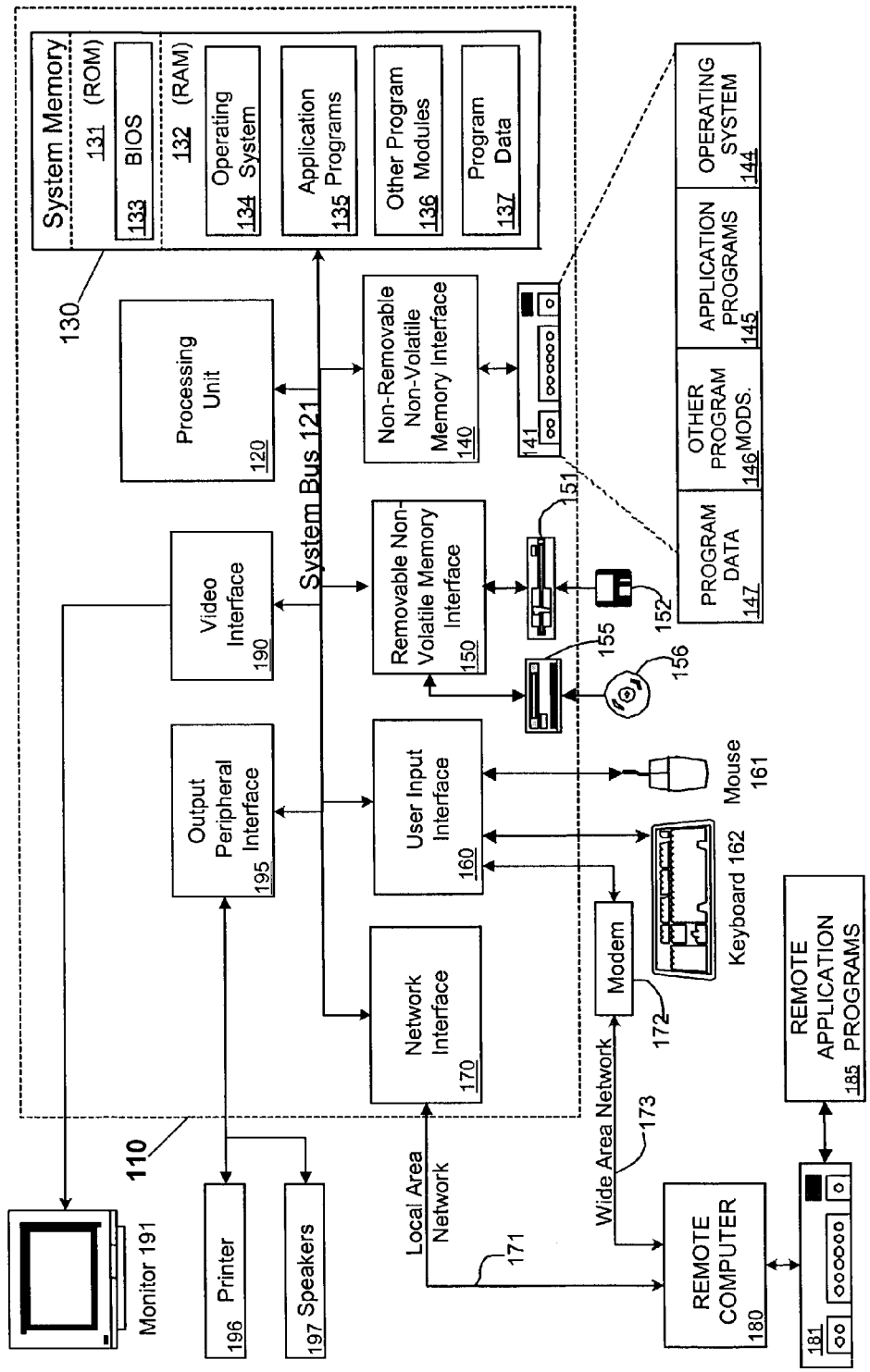
FIG. 5 illustrates an example of a suitable computing system environment in which the method and system for processing convoy scenarios in accordance with an exemplary of the present invention may be implemented.

FIG. 5 illustrates an example of a suitable computing system environment 500 in which the method and system for processing convoy scenarios may be implemented. The computing system environment 500 is only one example of a suitable computing environment and is not intended to suggest any limitation as to the scope of use or functionality of the method and system processing convoy scenarios. Neither should the computing environment 500 be interpreted as having any dependency or requirement relating to any one or combination of components illustrated in the exemplary operating environment 500.

The method and system for processing convoy scenarios are operational with numerous other general purpose or special purpose computing system environments or configurations. Examples of well known computing systems, environments, and/or configurations that may be suitable for use with the method and system for processing convoy scenarios include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method and system processing convoy scenarios may be described in the general context of computer-executable instructions, such as program modules, being executed by a computer. Generally, program modules include routines, programs, objects, components, data structures, etc. that perform particular tasks or implement particular abstract data types. The method and system for processing convoy scenarios may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the method and system for processing convoy scenarios includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/non-volatile computer storage media. By way of example only, FIG. 5 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the method and system for processing convoy scenarios may also be implemented via an operating system, application program interface (API), or a "middle man" object between a coprocessor and requesting object, such that services may be performed by, supported in, or accessed via all of .NET's languages and services, and in other distributed computing frameworks as well.

A method for processing convoy scenarios as described herein may be embodied in the form of computer-implemented processes and system for practicing those processes. A method processing convoy scenarios as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for processing convoy scenarios as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A computer-implemented method for processing convoy scenarios in a message driven process, said method comprising:
    analyzing a static workflow application for receiving and processing messages;
    determining if at least one convoy scenario exists in said static workflow application, a convoy scenario comprising a scenario wherein:
        at least a portion of receivable messages are related;
        a relationship of related messages is determinable upon receipt of a first one of said related messages;
        a plurality of messages are receivable prior to processing any of said related messages; and
        said related messages are to be handled by a common process;
    classifying each existing convoy scenario as one of a plurality of convoy classes, said plurality of convoy classes comprising at least one of:
        a parallel convoy class, wherein related received messages are to be dispatched to parallel instances of a process; and
        a sequential convoy class, wherein related received messages are be dispatched to sequential instances of a process, and
    for each convoy class, generating a convoy-class-specific infrastructure for correlating incoming messages of a convoy class with processes associated with said each convoy class and message type,
    wherein said parallel convoy class comprises an activation convoy class, wherein:
        an instance of a process is instantiated in response to a first received message of a plurality of related messages belonging to said activation convoy class;
        said first received message of said activation convoy class is to be dispatched to said instance; and
        subsequently received messages of said activation convoy class are to be dispatched to said instance.

2. The method in accordance with claim 1, wherein said processes comprise business processes.

3. The method in accordance with claim 2, wherein said messages are represented in a form of an extensible markup language (XML) and said business processes are represented in a form of an XLANG/s language.

4. The method in accordance with claim 1, said sequential convoy class comprising a uniform sequential convoy class, wherein: related messages are of a common type; and related messages are to be processed in an order of receipt.

5. The method in accordance with claim 1, said sequential convoy class comprising a non-uniform sequential convoy class, wherein; related messages are of different types; and related messages are to be processed in a predetermined order.

6. The method in accordance with claim 1, wherein said act of determining comprises interpreting a convoy class identifier embedded within each receive message statement of said static workflow application.

7. The method in accordance with claim 1, wherein said convoy-class-specific infrastructure is compatible with a .NET runtime environment.

8. A computer readable storage medium encoded with a computer program code for directing a computer processor to process convoy scenarios in a message driven process, said computer program code comprising:
    an analyze code segment for causing said computer processor to analyze a static workflow application for receiving and processing messages;

a determine code segment for causing said computer processor to determine if at least one convoy scenario exists in said static workflow application, a convoy scenario comprising a scenario wherein:
   at least a portion of receivable messages are related;
   a relationship of related messages is determinable upon receipt of a first one of said related messages;
   a plurality of messages are receivable prior to processing any of said related messages; and
   said related messages are to be handled by a common process;
a classify code segment for causing said computer processor to classify each existing convoy scenario as one of a plurality of convoy classes, said plurality of convoy classes comprising at least one of:
   a parallel convoy class, wherein related received messages are to be dispatched to parallel instances of a process; and
   a sequential convoy class, wherein related received messages are be dispatched to sequential instances of a process; and
a generate code segment for causing said computer processor to, for each convoy class, generate a convoy-class-specific infrastructure for correlating incoming messages of a convoy class with processes associated with said each convoy class and message type,
wherein said parallel convoy class comprises an activation convoy class, wherein:
   an instance of a process is instantiated in response to a first received message of a plurality of related messages belonging to said activation convoy class;
   said first received message of said activation convoy class is to be dispatched to said instance; and
   subsequently received messages of said activation convoy class are to be dispatched to said instance.

9. The computer readable storage medium in accordance with claim 8, wherein said processes comprise business processes.

10. The computer readable storage medium in accordance with claim 9, wherein said messages are represented in a form of an extensible markup language (XML) and said business processes are represented in a form of an XLANG/s language.

11. The computer readable storage medium in accordance with claim 8, said sequential convoy class comprising a uniform sequential convoy class, wherein: related messages are of a common type; and related messages are to be processed in an order of receipt.

12. The computer readable storage medium in accordance with claim 8, said sequential convoy class comprising a non-uniform sequential convoy class, wherein; related messages are of different types; and related messages are to be processed in a predetermined order.

13. The computer readable storage medium in accordance with claim 8, wherein said act of determining comprises interpreting a convoy class identifier embedded within each receive message statement of said static workflow application.

14. The computer readable storage medium in accordance with claim 8, wherein said convoy-class-specific infrastructure is compatible with a .NET runtime environment.

15. A computer system for processing convoy scenarios in a message driven process, said computer system comprising:

a processor comprising a memory;
a compiler stored in said memory, said compiler comprising:
   means for analyzing a static workflow application for receiving and processing messages;
   means for determining if at least one convoy scenario exists in said static workflow application, a convoy scenario comprising a scenario wherein:
      at least a portion of receivable messages are related;
      a relationship of related messages is determinable upon receipt of a first one of said related messages;
      a plurality of messages are receivable prior to processing any of said related messages; and
      said related messages are to be handled by a common process;
   means for classifying each existing convoy scenario as one of a plurality of convoy classes, said plurality of convoy classes comprising at least one of: a parallel convoy class, wherein related received messages are to be dispatched to parallel instances of a process; and
      a sequential convoy class, wherein related received messages are be dispatched to sequential instances of a process; and
   for each convoy class, means for generating a convoy-class-specific infrastructure for correlating incoming messages of a convoy class with processes associated with said each convoy class and message type,
wherein said parallel convoy class comprises an activation convoy class, wherein:
   an instance of a process is instantiated in response to a first received message of a plurality of related messages belonging to said activation convoy class;
   said first received message of said activation convoy class is to be dispatched to said instance; and
   subsequently received messages of said activation convoy class are to be dispatched to said instance.

16. The computer system in accordance with claim 15, wherein said processes comprise business processes.

17. The computer system in accordance with claim 16, wherein said messages are represented in a form of an extensible markup language (XML) and said business processes are represented in a form of an XLANG/s language.

18. The computer system in accordance with claim 15, said sequential convoy class comprising a uniform sequential convoy class, wherein: related messages are of a common type; and related messages are to be processed in a order of receipt.

19. The computer system in accordance with claim 15, said sequential convoy class comprising a non-uniform sequential convoy class, wherein; related messages are of different types; and related messages are to be processed in a predetermined order.

20. The computer system in accordance with claim 15, wherein said means for determining comprises means for interpreting a convoy class identifier embedded within each receive message statement of said static workflow application.

21. The computer system in accordance with claim 15, wherein said convoy-class-specific infrastructure is compatible with a .NET runtime environment.

* * * * *